(12) United States Patent
Schwarz

(10) Patent No.: US 10,175,919 B2
(45) Date of Patent: *Jan. 8, 2019

(54) SYSTEM AND METHOD FOR HANDLING MULTI-FUNCTION PRINTERS AND APPLICATIONS AT A FACSIMILE SERVER

(71) Applicant: Open Text SA ULC, Halifax (CA)

(72) Inventor: Stephen Schwarz, Tucson, AZ (US)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,523

(22) Filed: Jan. 27, 2015

(65) Prior Publication Data

US 2015/0146256 A1    May 28, 2015

Related U.S. Application Data

(63) Continuation of application No. 13/316,001, filed on Dec. 9, 2011, now Pat. No. 8,970,881.

(60) Provisional application No. 61/421,949, filed on Dec. 10, 2010.

(51) Int. Cl.
   *G06F 3/12* (2006.01)
   *H04N 1/00* (2006.01)
   *G06K 15/00* (2006.01)

(52) U.S. Cl.
   CPC .......... *G06F 3/1207* (2013.01); *G06F 3/1231* (2013.01); *H04N 1/00127* (2013.01); *H04N 1/00204* (2013.01); *H04N 1/00244* (2013.01); *H04N 1/00973* (2013.01); *H04N 1/00212* (2013.01)

(58) Field of Classification Search
   CPC ........... H04N 1/00127; H04N 1/00204; H04N 1/00212; H04N 2201/0093; H04N 2201/0094; H04N 1/00244; H04N 1/00973; G06F 3/1207; G06F 3/1231
   See application file for complete search history.

(56) References Cited

U.S. PATENT DOCUMENTS

| | | | |
|---|---|---|---|
| 5,461,488 A | 10/1995 | Witek | |
| 5,644,404 A * | 7/1997 | Hashimoto et al. | .......... 358/402 |
| 5,754,640 A | 5/1998 | Sosnowski | |
| 5,761,284 A | 6/1998 | Ranalli et al. | |

(Continued)

FOREIGN PATENT DOCUMENTS

| | | |
|---|---|---|
| JP | 2003319128 | 11/2003 |
| WO | WO0160050 | 8/2001 |
| WO | WO03061270 | 7/2003 |

OTHER PUBLICATIONS

Notice of Allowance issued for U.S. Appl. No. 14/800,350, mailed Jan. 11, 2016, 8 pages.

(Continued)

*Primary Examiner* — Dov Popovici
(74) *Attorney, Agent, or Firm* — Sprinkle IP Law Group

(57) ABSTRACT

Embodiments disclosed herein disclose methods and systems utilizing a fax server. The method may include configuring at least one setting for a multifunction printer (MFP) at the fax server. The method may further include receiving a document. The method may further include determining the at least one setting associated with the MFP based on a network address associated with the received document and applying the at least one setting for the MFP at the fax server.

18 Claims, 5 Drawing Sheets

(56) References Cited

U.S. PATENT DOCUMENTS

| | | | |
|---|---|---|---|
| 5,780,549 A | 7/1998 | Ludwig | |
| 5,862,202 A | 1/1999 | Bashoura et al. | |
| 5,999,601 A | 12/1999 | Wells et al. | |
| 6,020,980 A | 2/2000 | Freeman | |
| 6,058,169 A | 5/2000 | Bramnick et al. | |
| 6,259,538 B1 | 7/2001 | Amit | |
| 6,301,611 B1 | 10/2001 | Matsumoto | |
| 6,310,942 B1 | 10/2001 | Bashoura et al. | |
| 6,512,593 B1 | 1/2003 | Yashiki | |
| 6,539,077 B1 | 3/2003 | Ranalli et al. | |
| 6,603,569 B1 | 8/2003 | Johnson | |
| 6,618,165 B1 | 9/2003 | Sehgal | |
| 6,825,947 B1* | 11/2004 | Asai | H04L 12/5825 358/1.18 |
| 6,922,255 B1 | 7/2005 | Tomida | |
| 7,057,752 B1 | 6/2006 | Klotz, Jr. | |
| 7,324,223 B1 | 1/2008 | Mori | |
| 7,480,065 B1 | 1/2009 | Trandal et al. | |
| 7,492,473 B2 | 2/2009 | Ferlitsch et al. | |
| 7,653,185 B2 | 1/2010 | Rebert et al. | |
| 8,249,228 B2 | 8/2012 | Street, Jr. | |
| 8,279,465 B2* | 10/2012 | Couchman | H04N 1/00209 358/1.13 |
| 8,310,710 B2 | 11/2012 | Phillips et al. | |
| 8,493,606 B2 | 7/2013 | Phillips et al. | |
| 8,937,736 B2 | 1/2015 | Rebert et al. | |
| 8,970,880 B2 | 3/2015 | Riedel et al. | |
| 8,970,881 B1 | 3/2015 | Schwarz | |
| 8,995,025 B2 | 3/2015 | Rebert | |
| 9,544,469 B2 | 1/2017 | Rebert et al. | |
| 9,596,381 B2 | 3/2017 | Rebert et al. | |
| 9,699,127 B2 | 7/2017 | Lennstrom et al. | |
| 9,912,833 B2 | 3/2018 | Rebert | |
| 9,948,826 B2 | 4/2018 | Riedel et al. | |
| 2001/0005268 A1* | 6/2001 | Eguchi | 358/1.9 |
| 2001/0005864 A1 | 6/2001 | Mousseau | |
| 2001/0027478 A1 | 10/2001 | Meier | |
| 2001/0056538 A1 | 12/2001 | Amano | |
| 2002/0018245 A1 | 2/2002 | Saito et al. | |
| 2002/0021791 A1 | 2/2002 | Heilmann | |
| 2002/0026498 A1* | 2/2002 | Kim | G06F 17/30876 709/218 |
| 2002/0033961 A1 | 3/2002 | Murphy | |
| 2002/0051146 A1 | 5/2002 | Tanimoto | |
| 2002/0054371 A1 | 5/2002 | Tanimoto | |
| 2002/0073181 A1 | 6/2002 | Christensen | |
| 2002/0157028 A1 | 10/2002 | Koue et al. | |
| 2003/0053444 A1 | 3/2003 | Swartz | |
| 2003/0086124 A1 | 5/2003 | Parry | |
| 2003/0133550 A1 | 7/2003 | Mazor et al. | |
| 2003/0142801 A1* | 7/2003 | Pecht | 379/100.01 |
| 2004/0004733 A1 | 1/2004 | Berker et al. | |
| 2004/0039797 A1 | 2/2004 | Simpson et al. | |
| 2004/0136513 A1 | 7/2004 | Chiu | |
| 2004/0218226 A1 | 11/2004 | Antognini et al. | |
| 2005/0086240 A1 | 4/2005 | Richardson et al. | |
| 2005/0086306 A1 | 4/2005 | Lemke | |
| 2005/0094176 A1* | 5/2005 | Matsuishi | G06F 9/45512 358/1.13 |
| 2005/0108323 A1 | 5/2005 | Taylor | |
| 2005/0162706 A1 | 7/2005 | Eguchi | |
| 2005/0168774 A1 | 8/2005 | Eguchi et al. | |
| 2005/0190402 A1* | 9/2005 | Nakamura | 358/1.15 |
| 2005/0270558 A1 | 12/2005 | Konsella et al. | |
| 2005/0275871 A1 | 12/2005 | Baird et al. | |
| 2006/0227367 A1* | 10/2006 | Kitada | G06F 11/2028 358/1.15 |
| 2006/0238822 A1 | 10/2006 | Van Hoof | |
| 2007/0130271 A1 | 6/2007 | Ye et al. | |
| 2007/0130365 A1 | 6/2007 | Rebert et al. | |
| 2007/0146802 A1 | 6/2007 | Ushida | |
| 2007/0150242 A1* | 6/2007 | Kitada | G06F 8/65 703/3 |
| 2007/0168557 A1 | 7/2007 | Henry | |
| 2007/0297002 A1 | 12/2007 | Hase | |
| 2008/0019519 A1 | 1/2008 | Su | |
| 2008/0065477 A1 | 3/2008 | Korhonen | |
| 2008/0155108 A1 | 6/2008 | Morris | |
| 2008/0218809 A1 | 9/2008 | Chen et al. | |
| 2008/0252922 A1 | 10/2008 | Ikegami et al. | |
| 2008/0273220 A1* | 11/2008 | Couchman | H04N 1/00209 358/1.15 |
| 2009/0034015 A1 | 2/2009 | Mulligan | |
| 2009/0067414 A1 | 3/2009 | Toscano et al. | |
| 2009/0073499 A1 | 3/2009 | Glunz | |
| 2009/0088191 A1 | 4/2009 | Norton et al. | |
| 2009/0161168 A1* | 6/2009 | Miyamoto | 358/442 |
| 2009/0190159 A1 | 7/2009 | Toscano et al. | |
| 2009/0222663 A1 | 9/2009 | Chow et al. | |
| 2009/0244617 A1 | 10/2009 | Matsutani | |
| 2009/0316182 A1 | 12/2009 | Lee | |
| 2009/0316203 A1 | 12/2009 | Dukie | |
| 2009/0323100 A1 | 12/2009 | Lee | |
| 2010/0002260 A1* | 1/2010 | Naylor et al. | 358/1.15 |
| 2010/0007917 A1 | 1/2010 | Webster et al. | |
| 2010/0039678 A1* | 2/2010 | Noel et al. | 358/448 |
| 2010/0067063 A1* | 3/2010 | Jang | 358/402 |
| 2010/0075673 A1 | 3/2010 | Colbert et al. | |
| 2010/0085609 A1 | 4/2010 | Hong | |
| 2010/0182651 A1* | 7/2010 | Rebert et al. | 358/434 |
| 2010/0097634 A1 | 8/2010 | Meyers et al. | |
| 2010/0208726 A1 | 8/2010 | Oliszewski et al. | |
| 2010/0281016 A1 | 11/2010 | Weissman | |
| 2010/0296121 A1 | 11/2010 | Shaheen, III et al. | |
| 2011/0110366 A1 | 5/2011 | Moore et al. | |
| 2011/0211218 A1* | 9/2011 | Gilmore | G06F 3/1207 358/1.15 |
| 2011/0274258 A1 | 11/2011 | Casalaina et al. | |
| 2012/0143658 A1 | 6/2012 | Toscano | |
| 2012/0257249 A1 | 10/2012 | Natarajan | |
| 2012/0274988 A1 | 11/2012 | Bloomfield | |
| 2012/0297471 A1* | 11/2012 | Smithson | 726/7 |
| 2013/0088741 A1 | 4/2013 | Murata et al. | |
| 2013/0091042 A1 | 4/2013 | Shah et al. | |
| 2013/0287189 A1 | 10/2013 | Cichielo et al. | |
| 2013/0293933 A1 | 11/2013 | Rebert et al. | |
| 2013/0346522 A1 | 12/2013 | Lennstrom et al. | |
| 2014/0204411 A1 | 7/2014 | Riedel et al. | |
| 2014/0307294 A1 | 10/2014 | Rebert | |
| 2014/0340717 A1 | 11/2014 | Meitappan | |
| 2015/0085324 A1 | 3/2015 | Rebert | |
| 2015/0138601 A1 | 5/2015 | Riedel et al. | |
| 2015/0181075 A1 | 6/2015 | Treber | |
| 2015/0319338 A1 | 11/2015 | Rebert | |
| 2017/0070618 A1 | 3/2017 | Rebert et al. | |
| 2017/0264580 A1 | 9/2017 | Lennstrom et al. | |
| 2018/0020121 A1 | 1/2018 | Riedel et al. | |
| 2018/0146112 A1 | 5/2018 | Rebert et al. | |

OTHER PUBLICATIONS

Office Action issued for U.S. Appl. No. 13/927,023, mailed Feb. 9, 2016, 21 pages.

Office Action issued for U.S. Appl. No. 14/612,969, mailed Feb. 29, 2016, 18 pages.

Office Action issued for U.S. Appl. No. 13/315,978, mailed Dec. 16, 2013, 14 pages.

Schneider, "Introduction to Multi-Tenant Architecture," Feb. 11, 2009, [retrieved on Dec. 8, 2010, from <<http:www.developer.com/design/article.php/3801931>> 4 pages.

"Multi-tenant Architecture," © 2009-2010 Zscaler, Inc., [retrieved on Dec. 8, 2010, from <<http://www.zscaler.com/multi-tenant.html>>] 2 pages.

Chong et al., "Architecture Strategies for Catching the Long Tail," Microsoft Corporation, Apr. 2006, [retrieved on Dec. 8, 2010, from <<http://msdn.microsoft.com/en-us/library/aa479069(printer).aspx>>, 20 pages.

"Cloud-based Networking-Why Multi-tenancy Matters," White Paper, © 2010 Pareto Networks™, 14 pages.

Partial Search Report issued for European Patent Application No. 13 173 845.2, mailed on Nov. 14, 2013, 5 pages.

(56) References Cited

OTHER PUBLICATIONS

Extended Search Report issued for European Patent Application No. 13 173 845.2, mailed on Mar. 4, 2014, 9 pages.
International Search Report and Written Opinion issued for PCT Application No. PCT/EP2013/059026, completed on Jun. 21, 2013 and mailed on Jul. 2, 2013, 10 pages.
Office Action issued in U.S. Appl. No. 13/485,140, mailed Feb. 24, 2014, 14 pages.
Final Office Action issued for U.S. Appl. No. 13/485,140, mailed on Aug. 7, 2014, 18 pages.
International Preliminary Report on Patentability (IPRP) issued for PCT Application No. PCT/EP2013/059026, mailed on Nov. 13, 2014, 7 pages.
Office Action issued for U.S. Appl. No. 14/606,519, mailed Mar. 9, 2015, 15 pages.
Office Action issued for U.S. Appl. No. 14/556,958, mailed Mar. 30, 2015, 8 pages.
Office Action issued for U.S. Appl. No. 13/927,023, mailed Apr. 7, 2015, 16 pages.
Notice of Allowance issued for U.S. Appl. No. 14/556,958, mailed Jul. 17, 2015, 6 pages.
Office Action issued for U.S. Appl. No. 14/606,519, mailed Sep. 8, 2015, 14 pages.
Office Action issued for U.S. Appl. No. 13/927,023, mailed Sep. 23, 2015, 20 pages.
Office Action issued for U.S. Appl. No. 14/800,350, mailed Sep. 10, 2015, 8 pages.
Notice of Allowance issued for U.S. Appl. No. 14/556,958, mailed Dec. 11, 2015, 7 pages.
Final Office Action issued for U.S. Appl. No. 14/606,519, mailed Dec. 17, 2015, 14 pages.
Notice of Allowance issued for U.S. Appl. No. 14/556,958, dated Mar. 24, 2016, 6 pages.
Notice of Allowance issued for U.S. Appl. No. 14/800,350, dated Apr. 22, 2016, 3 pages.
Office Action for U.S. Appl. No. 14/606,519, dated May 3, 2016, 14 pgs.
Office Action issued for U.S. Appl. No. 14/612,969, dated Aug. 2, 2016, 19 pages.
Notice of Allowance issued for U.S. Appl. No. 13/927,023, dated Aug. 10, 2016, 11 pages.
Notice of Allowance issued for U.S. Appl. No. 14/800,350, dated Aug. 10, 2016, 3 pages.
Corrected Notice of Allowance issued for U.S. Appl. No. 13/927,023, dated Aug. 24, 2016, 8 pages.
Office action issued for U.S. Appl. No. 14/606,519, dated Oct. 12, 2016, 15 pages.
Notice of Allowance issued for U.S. Appl. No. 13/927,023, dated Nov. 8, 2016, 5 pages.
Notice of Allowance issued for U.S. Appl. No. 14/800,350, dated Nov. 7, 2016, 4 pages.
Office Action issued for U.S. Appl. No. 14/612,969, dated Feb. 7, 2017, 16 pages.
Notice of Allowance issued for U.S. Appl. No. 13/927,023, dated May 24, 2017, 7 pages.
Office Action issued for U.S. Appl. No. 15/356,078, dated Feb. 24, 2017, 10 pages.
Office Action issued for U.S. Appl. No. 14/612,969, dated May 30, 2017, 15 pages.
Office Action issued for U.S. Appl. No. 14/606,523, dated Jun. 19, 2017, 25 pages.
Office Action issued for U.S. Appl. No, 15/356,078, dated Jun. 2, 2017, 6 pages.
Notice of Allowance issued for U.S. Appl. No. 14/606,519, dated Jun. 27, 2017, 6 pages.
Office Action issued for U.S. Appl. No. 15/609,843, dated Jul. 12, 2017, 25 pages.
Notice of Allowance issued for U.S. Appl. No. 15/356,078, dated Feb. 14, 2018, 11 pages.
Notice of Allowance issued for U.S. Appl. No. 14/606,519, dated Feb. 26, 2018, 8 pages.
Notice of Allowance issued for U.S. Appl. No. 14/612,969, dated Sep. 28, 2017, 11 pages.
Office Action issued for U.S. Appl. No. 15/356,078, dated Oct. 2, 2017, 6 pages.
Office Action issued for European Patent Application No. 13 173 845.2, dated May 31, 2017, 8 pages.
Notice of Allowance issued for U.S. Appl. No. 14/612,969, dated Dec. 11, 2017, 8 pages.
Office Action issued for U.S. Appl. No. 15/609,843, dated Jan. 9, 2018, 18 pages.
Notice of Allowance issued for U.S. Appl. No. 15/718,654, dated Apr. 10, 2018, 9 pages.
Office Action issued for U.S. Appl. No. 15/609,843, dated May 10, 2018, 15 pages.
Notice of Allowance issued for U.S. Appl. No. 15/356,078, dated May 21, 2018, 5 pages.

\* cited by examiner

| Owner | |
|---|---|
| 605 — Id | The system id of owner. |
| IsDeleted | Has this user been deleted. |
| TimeDeleted | The time the user was deleted. |
| EmailAddress | The users email address. |
| TenantId | The id of the tenant this user belongs to. |
| IsDisabled | Has this user been disabled. |
| IsHidden | Is this a hidden user. |
| 610 — Name | The name of the user. |
| FaxNumber | The users fax number. |
| 615 — Type | What type of owner. |
| NetworkAddress | The network address of the device. |
| 620 { SerialNumber | The serial number of the device. |
| Manufacturer | The manufacturer of the device. |
| Model | The model name of the device. |
| Application | |

- Standard Owner properties
- Indicates which Owner type the object is. (Device, Application, User)
- Device specific properties
- Application specific properties

| Field | Description |
|---|---|
| 705 — $(ToVoiceNumber) | |
| 710 — ($FromVoiceNumber) | |
| 720 — ($FromEmailAddress) | |
| 730 — ($BillingCode1) | |
| 740 — ($BillingCode2) | |
| 750 — ($Notes) | |
| 760 — $(TotalPageCount) | Automatically generated by the fax appliance. The user can not directly enter or change this data. |
| 770 — $(CreationDate) | Automatically generated by the fax appliance when the cover sheet is added to the fax. The user can not enter or change this data. |

SYSTEM AND METHOD FOR HANDLING MULTI-FUNCTION PRINTERS AND APPLICATIONS AT A FACSIMILE SERVER

CROSS-REFERENCE TO RELATED APPLICATIONS

This patent application is a continuation of, and claims a benefit of priority under 35 U.S.C. § 120 from U.S. patent application Ser. No. 13/316,001, filed Dec. 9, 2011, now U.S. Pat. No. 8,970,881, entitled "SYSTEM AND METHOD FOR HANDLING MULTI-FUNCTION PRINTERS AND APPLICATIONS AT A FACSIMILE SERVER," which claims the benefit of priority under 35 U.S.C. 119(e) to U.S. Provisional Patent Application Ser. No. 61/421,949, filed Dec. 10, 2010, entitled "SYSTEM AND METHOD FOR HANDLING MULTI-FUNCTION PRINTERS AND APPLICATIONS AT A FACSIMILE SERVER," the entire contents of which are hereby expressly incorporated by reference for all purposes.

TECHNICAL FIELD

This application relates in general to methods and systems for serving facsimiles, and more particularly to methods, systems, and computer program products for handling multi-function printers and applications.

BACKGROUND

Computer networks generally enable data communications between computing devices that are connected to such computer networks. The computing devices within the computer networks may be a multi-function printer (MFP) and/or a fax server.

A MFP is an office machine that incorporates the functionality of multiple devices into one device. For example, the functionality of a printer, scanner, photocopier, fax and email machine may be combined in a single MFP. Furthermore, the MFP may be configured to transmit fax documents to a fax server.

A fax server typically includes a device equipped with one or more modems, fax boards, emulators for Fax over IP (e.g., T.38 emulators). The fax server can also receive faxes, from devices such as an MFP, and store the incoming faxes in a repository or forward the faxes to users (e.g., via email or other messaging mechanism).

Conventionally, when a fax server receives incoming documents from devices such as a MFP, the fax server may assign default attributes, rules, or settings to the received documents based on default settings or settings associated with a human user.

SUMMARY

Example embodiments relate to systems, a computer program product with executable portions, and methodology for utilizing multifunction printers and a fax server within a network.

Embodiments described herein include establishing profiles for devices (including multi-function printers (MFPs)) and applications at a fax server and processing documents at the fax server according to the profile of the device or application providing the document to the fax server. According to one embodiment, a device or application can be defined in the same level of a hierarchy as a human user such that the device or application is treated by the fax server as a peer to a human user.

One embodiment of a method may include configuring at least one setting for a multifunction printer (MFP) at the fax server. The method may further include receiving a document from the MFP, and determining the at least one setting associated with the MFP based on a network address associated with the received document. The method may also include applying the at least one setting for the MFP at the fax server.

Settings for the MFP may include cover sheets, routing and dialing rules, notifications or other settings. Settings for the MFP can specify, the printing a confirmation receipt on the MFP or sending a notification email to a corresponding email address for the MFP.

The configuring the at least one setting for the MFP at the fax server can be performed before receiving the document.

Another example embodiment includes a computer program product comprising at least one non-transitory computer readable medium storing instructions to perform a method comprising providing an interface to allow configuring at least one setting for a multifunction printer (MFP) at a fax server. The method may further include receiving a document and determining the at least one setting associated with the MFP based on a network address associated with the received document. The method may also include applying the at least one setting for the MFP at the fax server.

A further example embodiment may include a system comprising a fax server and a multi-function printer (MFP) connected to the fax server by a network. The fax server may be configured to maintain a profile for the MFP, and receive a document from the MFP. The fax server may also be configured to determine at least one setting associated with the MFP from the profile based on at least one piece of MFP identification information received with the document, apply the at least one setting associated with the MFP, and fax the document to a destination.

These, and other, aspects of the disclosure may be better appreciated and understood when considered in conjunction with the following description and the accompanying drawings. It should be understood, however, that the following description, while indicating various embodiments of the disclosure and numerous specific details thereof, is given by way of illustration and not limitation. Many substitutions, modification, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer conception of the systems and methods will become more readily apparent by referring to the exemplary, and therefore non-limiting, embodiments illustrated in the drawings, wherein identical reference numerals designate the same components. The embodiments may be better understood by reference to one or more of these drawings in combination with the description presented herein. It should be noted that the features illustrated in the drawings are not necessarily drawn to scale.

FIG. 6 depicts a diagrammatic representation of a data structure containing information for an MFP.

FIG. 7 depicts an example embodiment of configuration info for an MFP.

DETAILED DESCRIPTION

Figure 1:
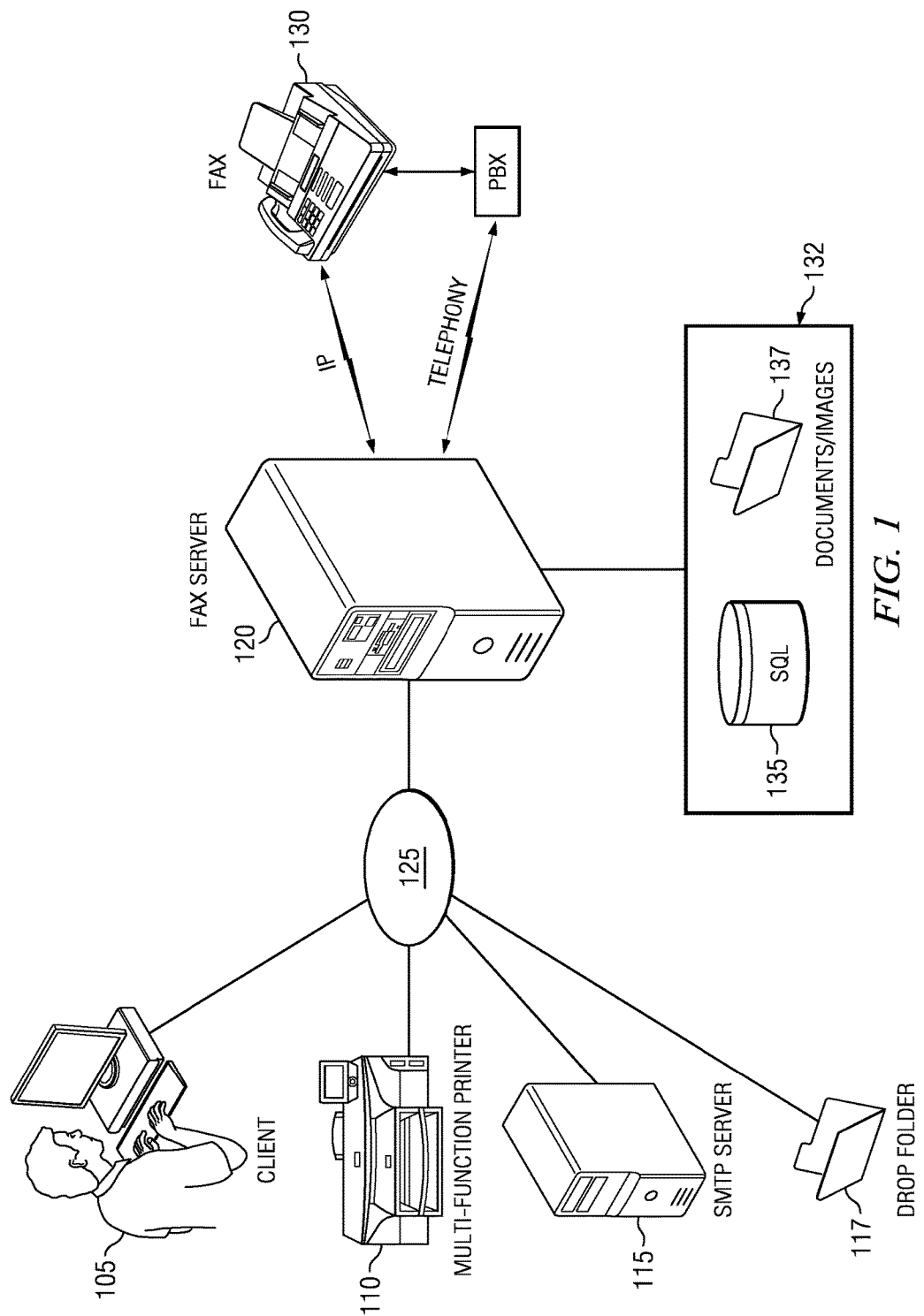
FIG. 1 depicts a diagrammatic representation of one embodiment of a system for sending/receiving faxes.

The various features and advantageous details thereof of various embodiments are explained more fully with reference to the accompanying drawings and detailed in the following description. Descriptions of well known starting materials, processing techniques, components and equipment are omitted so as not to unnecessarily obscure the embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Furthermore, as used herein the term facsimile, fax or any variation thereof, are non-inclusive terms for objects or data that may be faxed from one entity to another.

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

In some cases, it may be desirable for a fax server to apply settings to documents transmitted by an MFP or application based on the MFP or application. One embodiment of a fax server described herein can allow MFPs and/or applications to be defined in the same manner as human users, thereby allowing MFPs and/or applications to be treated as peers to users when it comes to applying settings to documents.

Applications may refer to any computer program allowing a device to perform an activity, function or executable code. Accordingly, an application may manipulate text, numbers, graphics, characters or any other data within a computing network. Furthermore, as used herein the document may be used as a container for any type of digital content, including facsimiles, voice messages, videos, word processing documents, spreadsheets, and any other type of media including multimedia.

FIG. 1 is a diagrammatic representation of one embodiment of a system configured to send and/or receive faxes. The embodiment of FIG. 1 includes a Fax server 120 including fax boards or emulators to communicate with fax machine 130 via fax-over-IP or PBX or other facsimile transport technology. Fax server 120 includes a data store 132 that can include a repository 135, such as a SQL database, and a file system 137 for storing images or documents. The fax server 120 may be an integrated hardware and software system that manages communications between multiple devices, such as the fax machine 130, client devices 110 and/or MFPs 110.

Users can provide documents to fax server 120 from client computers 105, multifunction printers (MFPs) 110, email servers' 115, drop folders 117, such as provided by DropBox.com. Depending on the user and/or device used to submit a document, fax server 120 may apply various routing or other rules to documents.

Documents may be provided to fax server 120 over network 125. Network 125 may be a LAN, WAN or other network. According to one embodiment, network 125 can include the Internet such that fax server 120 provides an Internet accessible service. Communication between server 120 and other devices can occur using cabled or wireless networking.

Figure 2:
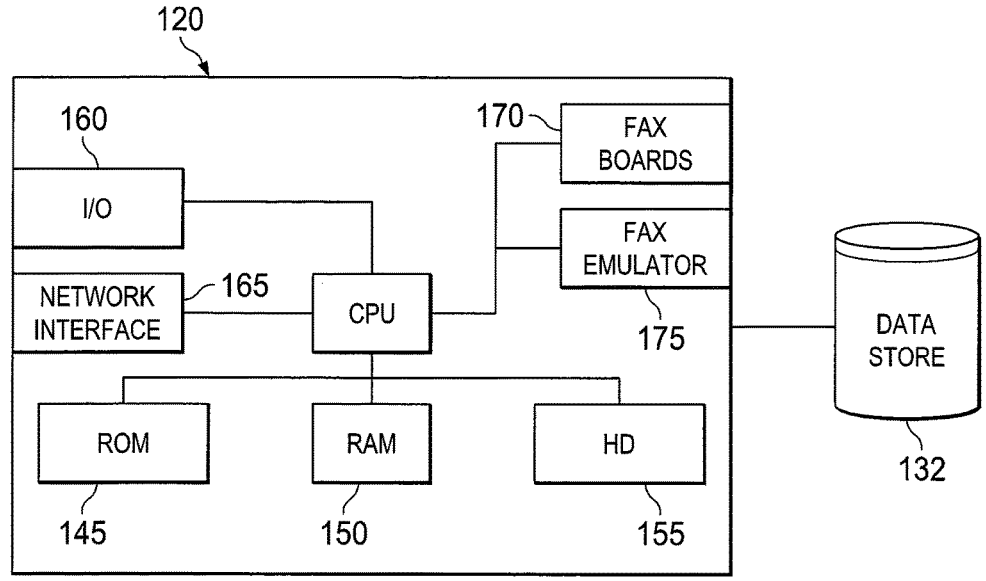
FIG. 2 depicts a diagrammatic representation of one embodiment of a fax server.

FIG. 2 depicts a diagrammatic representation of fax server 120. Fax server 120 can include a CPU 140, ROM 145, RAM 150, HD 155, I/O 160, network interface 165, fax boards 170, fax emulator 175 and/or other hardware. Fax server 120 may route documents using a variety of transport mechanisms including fax boards (e.g., by Eicon, Intel, Brooktrout or others), Board Server, Push Proxy Gateways, SMTP, MIME, T.37 or T.38 and other fax servers (e.g., such as a RightFax fax server by OpenText, Corporation).

Fax server 120 can store a fax server program 180 on a non-transitory storage medium (e.g., HD 155, RAM 150, optical disk, floppy disk, cartridge or other non-transitory storage medium). Fax server 120 can maintain a data store 132 internal or external to fax server 120 and a file system for storing files. Files can be stored with related metadata including, but not limited to the user that submitted the document or to which the document is directed etc.

Figure 3:
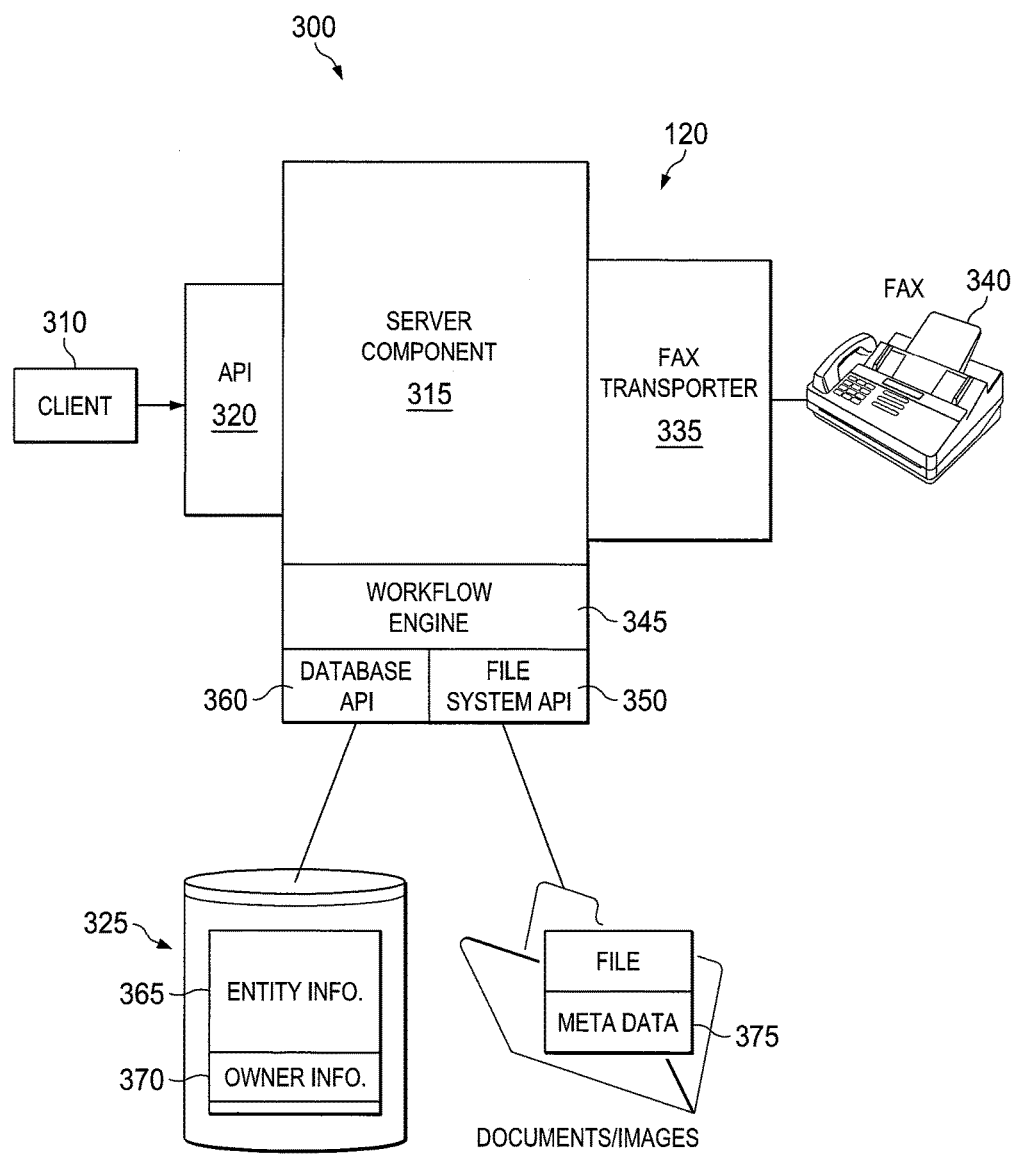
FIG. 3 is a block diagram of one embodiment of a system for processing documents.

FIG. 3 illustrates one embodiment of a system 300 for processing documents using a fax server 120. A client application 310 can communicate with server component 315 using API 320. A document received from client application 310 can be stored in repository 325 by a server component 315. The document can be forwarded to a fax board, emulator or other transport by the fax transporter 335. According to one embodiment, fax transport 335 can be a universal document transport DocTrans module as described in U.S. patent application Ser. No. 12/634,267, which is hereby fully incorporated by reference herein. Fax transporter 335 may communicate with hardware for sending and receiving faxes via, for example, cards or internet protocol address. According to one embodiment, documents communicated to the fax transporter 335 may be XML or TIFF.

As part of sending a document, fax transport 335 can apply dialing or routing rules to determine how fax server 120 is to transport or route a document. As an example, dialing or routing rules may indicate that a document that is sent at a specific time or is from a particular application is to be sent using a specific document transport. Example transports include fax boards (e.g., from Brooktrout, Eicon, Intel, etc.), SMS devices, routers for T.38 fax, email, T.37 fax, a DocPlus provider, virtual implementation of the above including document transmission simulations and so forth.

The fax transport 335 selects a target based on the applied dialing and routing rules. As example, fax transport 335 may select a public service telephone network ("PSTN"), another fax server, a board server containing one or more communications devices and so forth. As examples, the fax transport 335 may select a target based metadata, type of document or other attributes relating to the document.

In the opposite direction, fax transporter 335 can receive faxes from the fax machine 340 and write each page to a file as it is received. Once all pages are received and written, the pages are read and a multipage image is created. Fax transporter 335 can forward the multipage image to server component 330, which can place the multipage image in repository 325. A client (e.g., client 310) can access the multi-page image through API 320. According to another embodiment, fax server 120 can send the document to clients via email or other mechanism.

Server component 315 can include a workflow engine 345 that manages the workflows of incoming and outgoing faxes, a file system API 350 to access the file system 335 for reading and writing files and a database API 360 for reading to and writing from repository 325. Server program 315 can store a set of entity information 365. Entity information 365 can include information about various entities, as described below, including owner information 370. According to one embodiment, server component 315 can maintain entity information 365 as a hierarchy of entities in the fax server system. Each facsimile document processed by server component 315 can be associated with one or more of the entities (e.g., through use of file metadata). Files can be stored with related metadata 375 that can travel with the file as the file is processed by fax server component 315.

In operation, client 310 may provide documents to fax server 120. When a document is sent to fax server 120, it may include or be accompanied by all or some of client or application information that identifies the client or application as the source of the document (e.g., client name, IP address, MAC address or other such information). Upon receiving a document from the client 310, the fax server component 315 may use information, such as entity information 365 to identify client 310, as the sender of the document and determine entity info 365 settings to apply.

According to one embodiment, entity information 365 may include a profile associated with the client 310. The corresponding profile for the client 310 may include routing rules and procedures, configuration settings such as a fax number, password, identification and other setting or rules information. By way of example, but not limitation, the profile information may specify what coversheet to apply when a document received from client 310 is sent as a fax.

Thus, by way of example but not limitation, various settings of the client 310 including the fax number, password, routing rules, address, cover page rules, identification and other information at the fax server component 315 may be assigned for client 310 at fax server component 315. Based on the profile, document transport component 335 can apply rules for documents transmitted by the client 310 or the fax server component 315 may process a document differently depending on the settings associated with the application transmitting the document.

According to one embodiment, client 310 may be configured as a user at the fax server 120, and settings and/or routing rules for the client 310 may be established as if the client 310 is a user. For example, a default fax cover sheet for a client 310 may be set for client 310 at the fax server. Furthermore, the client 310 may have multiple profiles with different settings/configurations at the fax server component 315.

Figure 4:
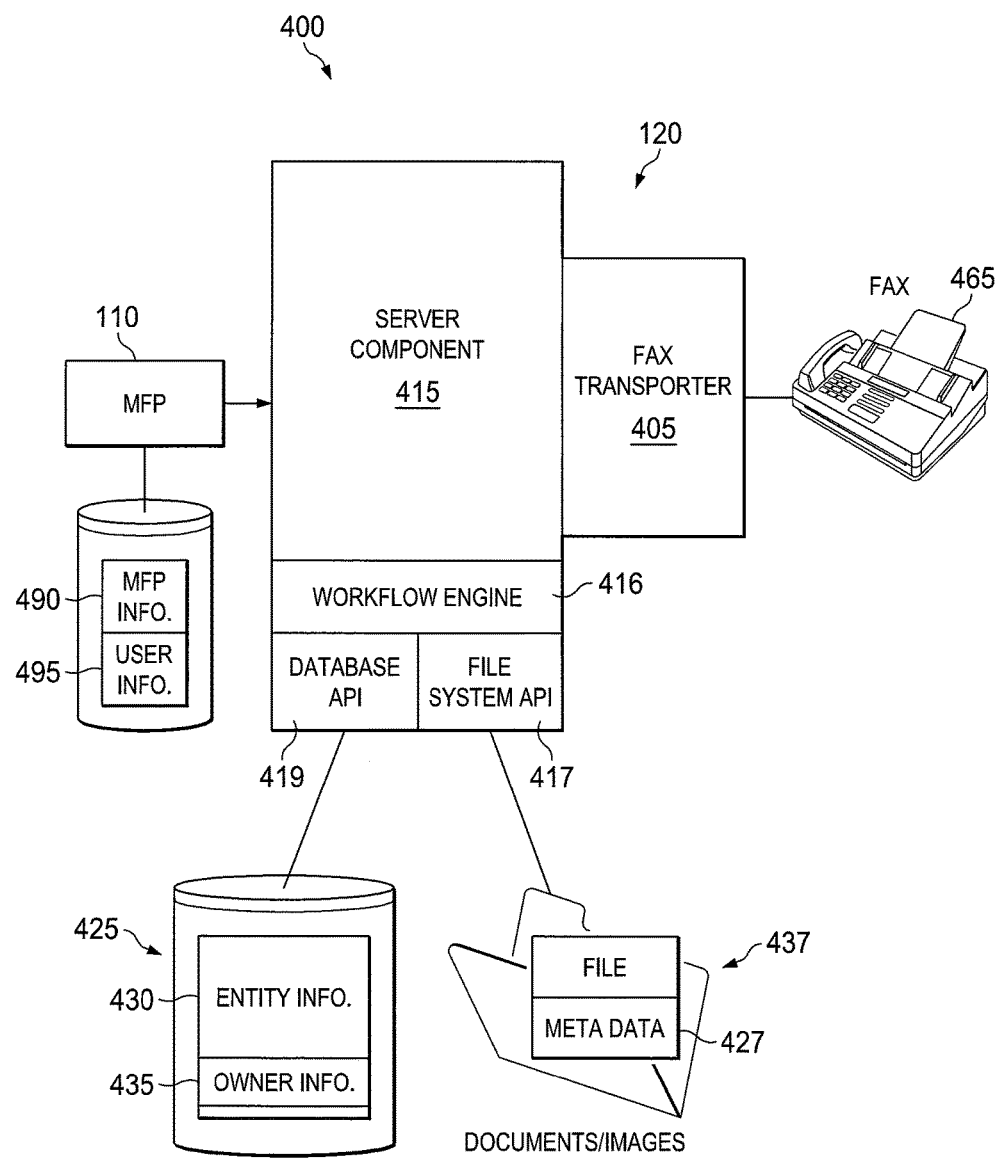
FIG. 4 is a block diagram of another embodiment of a system for processing documents.

As with applications, a fax server may receive documents from a device, such as an MFP or other device. Accordingly, FIG. 4 is a block diagram of one embodiment of a system 400 for processing documents comprising an MFP 110, a fax server 120 and a fax machine 430.

The MFP 110 may transmit to and receive faxes from fax server program 420. The MFP 110 may transmit documents in a plurality of ways to the fax server program 420. For example, a user of the MFP 110 may scan a document into an email and send the email to the fax server component 415. One common way of providing such emails is to address the email to a destination phone number (e.g., 555-555-5555) at a domain associated with the fax server 420 (e.g., @fax-server.company.com). A document may also be provided to fax server component 415 through an API, faxing the document or otherwise communicating the document to the fax server 120.

The MFP 110 may have a repository or memory storing MFP information 490 and user information 495. The MFP information 490 may include a name or identifier of the MFP 110 along with a network or IP address of the MFP 110. The MFP information 490 may be used to individually identify the device including for example NetworkAddress, SerialNumber, MAC address. MFP information may also include other device information such as manufacturer, model and other information. The user information 495 may include an email address and password of a user of the MFP 110 or other user information.

A document transmitted from the MFP 110 to the fax server component 415 may be stored in a repository 425. When the fax document is complete, the fax transporter 405 may communicate with fax machine 465, other fax transporter or other target to transmit the fax. As discussed above, fax transporter 405, according to one embodiment, can be a DocTrans module as discussed in U.S. patent application Ser. No. 12/634,637, which is hereby fully incorporated by reference herein.

The fax transport 405 may also receive faxes from the fax machine 465 and write each page to a file as it is received. The received documents may be stored with related metadata 427 that may be transmitted with the document as the document is processed by the fax server 420. Once all pages are received and written, the pages are read and a multipage image is created. Fax transporter 405 can forward the multipage image to fax server component 420, which can place the multipage image in repository 425 where the MFP 110 may access the multi-page image. The MFP 110 may access the multi-page image on the fax server 420 based on an identification of the MFP 110.

Server component 415 may maintain a set of entity information 430. According to one embodiment, server component 415 can maintain entity information 430 as a hierarchy of entities in the fax server system. Entity information 430 can include information about various entities, as described below, including owner information 435 and may include a profile associated with the MFP 110. The corresponding profile for the MFP 110 may include routing rules and procedures, configuration settings such as a fax number, password, identification and other setting or rules information. By way of example, but not limitation, the profile information may specify what coversheet to apply when a document received from MFP 110 is sent as a fax. Thus, various settings of the MFP 110 including a fax number, password, routing rules, address, cover page rules, identification and other information may be assigned for MFP 110 at fax server component 420.

According to one embodiment, MFP 110 may be configured as a user at the fax server 120, and settings and/or routing rules for the MFP 110 may be established as if the MFP 110 is a MFP user. For example, a default fax cover sheet for an MFP 110 may be set for MFP 110 at the fax server. Consequently, if the MFP 110 provides a document to the fax server for sending, the fax server component 420 may apply the appropriate cover sheet for that MFP 110 based on MFP info 490 for the MFP 110 that transmitted the fax document.

The fax server 120 may also include a workflow engine 416 that manages the workflows of incoming and outgoing faxes and a file system API 417 to access the file system 437 for reading and writing files and a database API 419 for reading to and writing from repository 425. Files can be stored with related metadata 427 that can travel with the file as the file is processed by fax server component 415.

In operation, MFP 110 may provide documents to fax server 120. When a document is sent to fax server 120, it may include or be accompanied by all or some of MFP info 490 or other information that identifies the MFP 110 as the source of the document (e.g., MFP name, IP address, MAC address or other such information.) Upon receiving a document from the MFP 110, the fax server component 420 and fax transporter 405 may use information, such as MFP info 490, to identify MFP 110 as the sender of the document and determine entity info 430 settings to apply. For example, upon identifying MFP 110 as the sender of the document, document transport component 405 can apply dialing and routing rules based on the MFP profile stored in entity info. 430. As another example, the fax server component 420 may process a document differently depending on the settings associated with the MFP 110 transmitting the document.

In some cases, MFP 110 may provide user information 495 for the human user that entered a document. For example, MFP 110, when sending a document to the fax server by email, may include in the email that the document was entered by J. Smith. If J. Smith is defined as a user at the fax server 120, the fax server 120 can resolve whether to use settings for the MFP 110 or the settings for the human user. In one embodiment, fax server component 420 can default to using settings of the human user, whereas in another embodiment the fax server 120 can default to using settings of the MFP 110. Furthermore, the MFP 110 may have multiple human user profiles with different settings/configurations at the fax server component 420.

Figure 5:
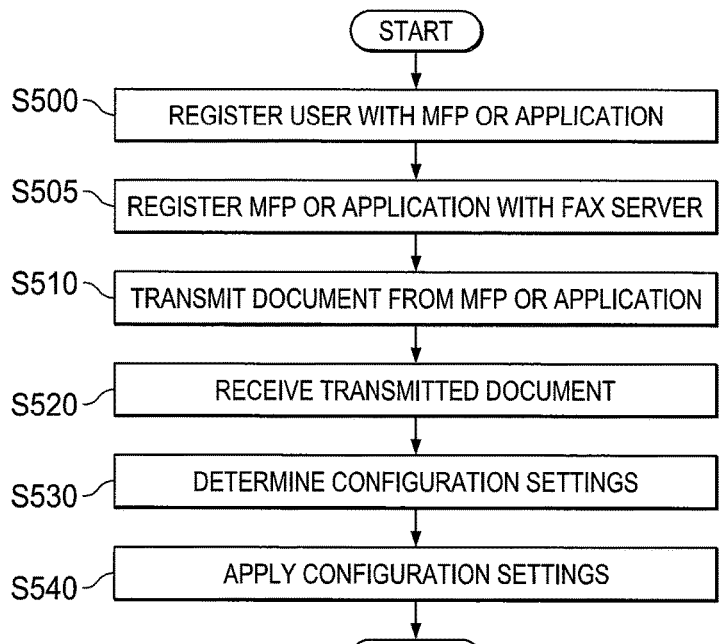
FIG. 5 depicts a flow diagram applying routing or transport rule of a MFP at a facsimile server.

FIG. 5 is a flow diagram representing applying routing or transport rules of a MFP at a facsimile server, with references to FIG. 1. In S500, a user may register user information with an MFP 110 or application. The user information may include information with users of the MFP 110, such as a name, email address, user name, and password at the MFP 110. The email address may be an email address corresponding with the user, the user name may be login identification for the MFP 110 and the password may be a password corresponding with the username. If the user has already registered with the MFP 110, the user may log onto the MFP 110 using the registered user name and password.

In S505, the MFP 110 and/or application may be registered with a fax server 120 to create, generate or form a profile for the MFP 110 or application and/or a human user. The MFP information may include a name or identifier of the MFP 110 along with a network or IP address of the MFP 110. The MFP information 490 may be used to individually identify the device including for example NetworkAddress, SerialNumber, MAC address. MFP information may also include other device information such as manufacturer, model and other information. Application information may include an application name, hardware information associated with the application (e.g., IP or MAC address of the computer running the application) a license number or other identification for the application. The MFP 110 and/or application may be registered with the fax server as a "user" with an associated profile.

The profile of the MFP 110 or application at the fax server 120 may include a variety of information. As one example, the MFP 110 profile or application profile may include settings for a coversheet. As another example, a receipt or confirmation notification may be set for t MFP 110 or application. A receipt notification may request that a notification be sent to an email address associated with the profile of the MFP 110, or be printed on the MFP 110. A confirmation notification request may be an update corresponding to the status of the transmitted document. For example, the profile of the MFP 110 or application may be configured to require an update of the transmitted document based on if the document was received, was not received, is waiting to be received by a destination fax number.

In further example embodiments, if the MFP or application does not have registered configuration settings or preferences for the MFP 110 or application at the fax server 120, default settings associated with the MFP 110 or application may be used.

In S510, the MFP 110 or application may transmit a document to a fax server 120 via network 125 along with metadata identifying the MFP 110, application or the human user. For example, the MFP 110 may transmit a document via email to the fax server 120 or transmit a scanned and faxed document to the fax server 120 indicating the human user who entered the document at the MFP 110.

In S520, the fax server 120 may receive the transmitted document from the MFP 110 or application and the identification information metadata of the MFP 110 or application. For example, the identification metadata may be an internet protocol address or the fax number of the MFP 110 transmitting the document to be faxed.

In S530, the fax server 120 may parse the identification information metadata to determine the profile associated with the MFP 110 or application that transmitted the received document. More specifically, in one embodiment, the fax server 120 may determine the internet protocol address and/or the name of the MFP 110 or application that transmitted the document.

In S540, based on the parsing in S530, the fax server 120 may apply rules or perform actions based the configured profile settings of the corresponding MFP 110 or application at the fax server 120. More specifically, the fax server 120 may utilize the information stored in a repository of the fax server 120 to determine the configuration settings or routing rules corresponding with the profile of the MFP 110 or application that transmitted the document.

For example, if a profile of the MFP 110 has configuration settings corresponding to a cover page, the fax server 120 may apply the appropriate cover sheet to the received document. In other words, based on the fax server 120 determining a profile associated with the MFP 110 that transmitted the document to the fax server 120, the fax server 120 may determine the appropriate cover sheet to apply when the document is faxed.

In further example embodiments, the profile corresponding to the MFP 110 or server at the fax server 120 may include rules for formatting the received document, converting the received document into various data types, preparing a notification response to the MFP 110 or application, determining a language type or time zone associated with the transmitted document from the MFP 110 or application. Accordingly, the fax server 120 may apply the associated configuration settings or routing rules of the MFP 110 or application upon receiving a document.

In further example embodiments, the fax server 120 may determine a profile has configuration settings relating with a receipt confirmation of the transmitted document. Therefore, upon the fax server 120 determining that a document has been received by a destination fax number, the fax server 120 may transmit a receipt confirmation to the MFP 110, application or specified user based on the profile.

Thus, the MFP 110 or application may transmit limited information to the fax server 120 along with the document to be faxed to enable application of the configured profile settings of the MFP 110 at the fax server 120. Accordingly, less information may be transmitted over the network 125 during communications between the MFP 110 and the fax server 120 in order for settings, such as cover pages specific for the MFP (or group of MFPs, or applications) to be applied.

If the fax server 120 determines that a profile has not been configured within the fax server 120 for the MFP 110 or application that transmitted the document to the fax server 120, the fax server 120 may apply default profile settings to the received document.

FIG. 6 depicts a diagrammatic representation of a data structure 601 for establishing user profiles registered and stored on a memory or repository of a fax server 120. The data structure can include a variety of fields including an identification field 605 for the user, providing a unique system ID. The data structure may also include a name field 610 in which the name of the user is specified (e.g., J. Smith, MFP 1). The field 615 specifies whether the user is a human user, device or application. For devices, various pieces of device identification information can be included (Fields 620). The data structure 601 may be modified, adjusted or configured to include corresponding metadata.

In the example of FIG. 6, the type of device field may be set as "MFP" for the MFP 110 indicating the type of device. The MFP 110 may be identified by properties that can be used to identify the device including for example Network Address, Serial Number, MAC address. This information may be used in combination with other device information such as manufacturer, model and other information. In addition, information may be specified for owner applications, such as application name, network/address from which the application is sending/receiving documents or other information. Other information may include receipt confirmation and/or coversheet information.

The same data structure can be used to define profiles for human users as for devices (e.g., MFPs or other devices) and applications. Thus, MFPs and applications can be treated as peers to users by the fax server, having similar profile information and allowing for the application of rules, settings as if the MFP (or other device) or application were a human user.

FIG. 7 depicts an example embodiment of coversheet configurations associated with profile 601 for the MFP 110 at the fax server 120. The cover sheet 700 information includes a plurality of fields that may be configured by a corresponding user of the MFP 110. For example, the fields may represent a phone number or network address of the receiving device 705 (such as the fax server 120), a phone number or network address of the transmitting device 710 (such as the MFP 110), an email address 720 associated with the MFP 110 (such as a registered MFP 110 at the fax server 110), billing codes 730 and 740, any additional notes or description of the document 750, a total page count 760, and a transmission date of the document 770.

Accordingly, when a fax server 120 receives a document from the MFP 110, the above configuration settings for the cover sheet 700 may be determined by the fax server 120 based on the identification of the MFP 110. Therefore, the fields related with the cover page may be populated by information stored or generated by fax server 120. Different cover sheet configurations may be set for different MFPs. For example, different departments may utilize different cover sheets. Accordingly, an MFP in one department may be associated with one coversheet while an MFP from another department may be associated with another coversheet.

The data structures of FIGS. 6 and 7 are provided by way of example and other data structures may be used. Furthermore, because an MFP or application can be treated similarly to a user, an MFP/application can be assigned to roles, groups or other logical entities and can inherit settings based on roles, groups or hierarchical organizational structures and the like. By way of example, an MFP may be part of a multi-tenant architecture as described for example in U.S. Provisional Application No. 61/421,850, which is hereby fully incorporated by reference herein, and may inherit settings based on tenancy.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the embodiments may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed:

1. A method utilizing a fax server, the method comprising:
    configuring at least one setting for a device or an application at the fax server by storing the at least one setting in a set of rules in association with a profile for the device or the application stored in a repository of the fax server, wherein the set of rules include routing or transport rules associated with the device or application, and the profile is stored in a data structure including a field for identifying a user as a human, device or application, allowing the application of the set of rules for the device or application to a document as if the device or application was a human user of the fax server;
    receiving, at the fax server, the document over a network;
    determining, at the fax server, the at least one setting associated with the device or the application based on an identifier associated with the received document and the device or the application by determining a profile associated with the device or the application at the fax server based on the identifier and applying at least one of the set of rules in he determined profile stored in the repository of the fax server; and
    applying the at least one setting for the device or the application at the fax server, wherein the identifier is received over the network in association with the received document.

2. The method of claim 1, wherein the identifier is an IP address, a client name, a MAC address, or a serial number.

3. The method of claim 1, wherein the device or the application is configured as a user of the fax server.

4. The method of claim 1, wherein user information is received in association with the received document.

5. The method of claim 4, wherein the user information is used to determine the at least one setting.

6. The method of claim 1, wherein the set of rules further include a rule for formatting the document, converting the document, or preparing a notification response to the device or application.

7. A computer program product comprising at least one non-transitory computer readable medium storing instructions to perform, a method comprising:
    providing an interface to allow configuring at least one setting for a device or an application at a fax server;
    storing the at least one setting in a set of rules in association with a profile for the device or the application stored in a repository of the fax server, wherein the set of rules include routing or transport rules associated with the device or application, and the profile is stored in a data structure including a field for identifying a user as a human, device or application, allowing the application of the set of rules for the device or application to a document as if the device or application was a human user of the fax server;
    receiving the document over a network at the fax server;
    determining, at the fax server, the at least one setting associated with the device or the application based on an identifier associated with the received document and the device or the application by determining a profile associated with the device or the application at the fax server based on the identifier and applying at least one of the set of rules in the determined profile stored in the repository of the fax server; and
    applying the at least one setting for the device or the application at the fax server, wherein the identifier is received over the network in association with the received document.

8. The computer program product of claim 7 wherein the identifier is an IP address, a client name, a MAC address, or a serial number.

9. The computer program product of claim 7, wherein the device or the application is configured as a user of the fax server.

10. The computer program product of claim 7, wherein user information is received in association with the received document.

11. The computer program product of claim 10, wherein the user information is used to determine the at least one setting.

12. The computer program product of claim 7, wherein the set of rules further include a rule for formatting the document, converting the document, or preparing a notification response to the device or application.

13. A system comprising:
    a fax server including:
        a processor;
        a network interface for coupling the fax server to a network;
        and a non-transitory computer readable medium comprising instructions to:
        maintain a profile for a device or an application, wherein the profile is stored in a data structure including a field for identifying a user as a human, device or application, allowing the application of a set of rules for the device or application to a document as if the device or application was a human user of the fax server;

store at least one setting in the set of rules in association with the profile for the device or the application in a repository of the fax server, wherein the set of rules include routing or transport rules associated with the device or application;

receive, at the fax server, the document from the device or the application over the network;

determine, at the fax server, the at least one setting associated with the device or the application from the profile based on at least one piece of identification information received with the document and associated with the device or the application by determining the profile associated with the device or the application at the fax server based on the identification information and applying at least one of the set of rules in the determined profile stored in the repository of the fax server;

apply the at least one setting associated with the device or the application; and fax the document to a destination.

14. The system of claim 13, wherein the identification information is an IP address, a client name, a MAC address, or a serial number.

15. The system of claim 13, wherein the device or the application is configured as a user of the fax server.

16. The system of claim 13, wherein user information is received in association with the received document.

17. The system of claim 16, wherein the user information is used to determine the at least one setting.

18. The system of claim 13, wherein the set of rules further include a rule for formatting the document, converting the document, or preparing a notification response to the device or application.

* * * * *